United States Patent [19]

Haboian

[11] Patent Number: 5,345,812

[45] Date of Patent: Sep. 13, 1994

[54] SEAL LEAKAGE MONITORING DEVICE AND METHOD

[75] Inventor: Mark S. Haboian, Rochester, N.Y.

[73] Assignee: Eastman Kodak Company, Rochester, N.Y.

[21] Appl. No.: 903,831

[22] Filed: Jun. 24, 1992

[51] Int. Cl.⁵ .................................. G01M 3/28
[52] U.S. Cl. ........................ 73/46; 137/312; 137/557
[58] Field of Search ............ 73/49.2 T, 46, 709; 340/605; 137/312, 557

[56] References Cited

U.S. PATENT DOCUMENTS

| | | | |
|---|---|---|---|
| 3,641,542 | 2/1972 | Grove et al. | 340/605 |
| 3,848,765 | 11/1974 | Dürkop | 73/49.2 T |
| 3,901,217 | 8/1975 | Clark | 73/709 |
| 4,196,690 | 4/1980 | Alinari | 73/709 |
| 4,424,973 | 1/1984 | Heilala | 277/2 |
| 4,453,411 | 6/1984 | Shikasho | 73/709 |
| 4,658,986 | 4/1987 | Freed et al. | 73/40.5 R |
| 4,685,327 | 8/1987 | Sharp | 73/49.2 T |
| 4,850,389 | 7/1989 | Moss | 137/364 |
| 5,174,150 | 12/1992 | Mann | 73/49.2 T |
| 5,203,370 | 4/1993 | Block et al. | 73/46 |

Primary Examiner—Hezron E. Williams
Assistant Examiner—Michael J. Brock
Attorney, Agent, or Firm—Clyde E. Bailey

[57] ABSTRACT

A device for monitoring for fluid leakage in a double stem seal valve (24). The valve housing (25), stem (28), primary stem seal (30), and secondary stem seal (34) define a chamber (36) bounded therebetween. A pressure gauge (44) having a pointer (48) for registering and retaining a maximum pressure reading is mounted on the valve (24) and via a port (38) is in fluid communication with the chamber (36). Fluid leakage into the chamber (36) sufficient to increase the chamber pressure can be registered and retained by the pointer (48), indicating the failure of the primary stem seal (30) and the occurrence of a leak.

3 Claims, 2 Drawing Sheets

SEAL LEAKAGE MONITORING DEVICE AND METHOD

FIELD OF INVENTION

The present invention is directed to a device for monitoring for leakage, in a fluid-containing system or in a valve, past a primary seal into a chamber between the primary seal and a secondary seal. The present invention is also directed to a method for monitoring for leakage from a fluid-containing system past the primary seal into the chamber between the two seals.

BACKGROUND OF THE INVENTION

In chemical processing and other industries, the manufacture, transportation, storage, and other operations involving chemicals, combustible fluids, and other hazardous materials necessitates containment and containment assurance of such materials. Increasingly, environmental and safety regulations and laws address hazardous fluids containment and containment assurance. Accordingly, there is a continuing need for containment systems and devices that comply with the laws and the regulations.

One prior art leakage containment device provides a leakage collecting tank positioned below a component to collect leakage from the component. For example, the tank can comprise a well or other such structure open at the top. A disadvantage is that dirt, rain, snow, and ice may also accumulate in the tank, obscuring the existence of a leak. Furthermore, solvent leaks can go undetected by virtue of the open tank construction allowing atmospheric evaporation, which can also create environmental release problems.

U.S. Pat. No. 4,850,389 describes a device and method for monitoring an enclosed cavity for leakage. A ground seal and a pressure seal define a cavity that is provided with a pneumatic fitting. The cavity is pressurized and monitored by a detachable pressure monitoring gauge. A decrease in monitored pressure can indicate the existence of a leak either through the ground seal or through the pressure seal. A shortcoming, however, is that it does not indicate which seal is leaking if just one of the seals leaks and therefore would not provide adequate containment assurance for a system having a primary seal and a secondary, backup containment seal. Also, the initial pressure charge can leak out, providing a false indication of seal failure. Another drawback is that the cavity pressure can vary depending on temperature.

U.S. Pat. No. 4,424,973 describes a leak indicator that comprises a plug having a liquid sensor electrically connected to an indicator instrument. The plug leak indicator is connected to a channel that at an opposite end terminates at a sealing ring. Leakage of liquid past the sealing ring into the channel activates the sensor to generate an electrical signal to the instrument. A shortcoming of this device is that it is relatively complex and expensive, particularly for applications in which leak detectors are required to be installed in a plurality of locations.

U.S. Pat. No. 4,453,411 describes a pressure memory device for trapping fluid in a chamber to register and retain the highest or lowest pressure occurring in a fluid-containing system. The device comprises a manifold having a through bore with a check valve disposed therein and a second bore intersecting a third and a fourth bore. Two of the bores are sealed with plugs and a second valve is secured in a bore. The device can be used in conjunction with a standard pressure gauge to obtain the highest or lowest system pressure. The device, however, is complex and provides just a single point reading of maximum system pressure.

It is an object of the invention to solve one or more of the above-stated problems.

SUMMARY OF THE INVENTION

In accordance with the invention, there is provided a fluid-containing system comprising a tank for storing a chemical or hazardous fluid and a valve. In this embodiment, the valve comprises a stem, a primary stem seal, a secondary stem seal, and a chamber between the primary and secondary stem seals. A pressure gauge is positioned in fluid communications with the chamber. The gauge comprises a first pointer for registering existing pressure in the chamber, and a second pointer which remains fixed at the maximum pressure registered by the first pointer.

The invention can be used in any fluid handling or storing system having a primary seal and secondary seal containment which define a chamber that can be accessed for installation of the pressure gauge with maximum pressure indicator. For example, the invention can be employed in a chemical processing or refining facility in which chemicals are manufactured, stored, and-/or transferred. The primary and secondary seals may be positioned in a piping system, or in other apparatus or systems, for example a fluid-handling tank; the leak detection device described herein is useful in any such embodiment. Other applications include railroad cars, tank trailers, load luggers, totes, and drums, to name but a few.

In another aspect of the invention, there is providing secondary containment for a valve in a fluid-containing system. The fluid-containing system comprises a tank for storing a chemical or hazardous waste, conduit means for transporting the fluid to the tank, conduit means for removing fluid from the tank, means for secondary containment of fluid leaks from the tank, and a valve for controlling flow of the fluid through the conduit means. The valve is positioned at a location in the system remote from the means for secondary containment of fluid leaks from the tank. In this embodiment of the invention, the valve comprises a stem, a primary stem seal, a secondary stem seal, and a chamber between the primary and secondary stem seals. A pressure gauge is provided having a first pointer for registering existing pressure in the chamber and a second pointer which fixed the maximum pressure registered by said first pointer. The pressure gauge is then positioned in fluid communication with the chamber so that a fluid leak past the primary seal into the chamber sufficient to increase the chamber pressure is registered by the first pointer and retained by said second pointer. Thereafter, the pressure gauge is visually monitored to determine the maximum pressure occurrence in the chamber.

The device and method of the invention do not have the disadvantages of the prior art noted above. It is simple and inexpensive, especially for installations requiring a plurality of leakage monitors. A maximum pressure reading can be registered and retained, enabling the detection of a fluid leak in spite of subsequent fluctuations in system operating conditions, chamber pressure, or ambient temperature. Visual monitoring for fluid leaks is unaffected by conditions such as dirt, snow, rain, or ice that can obscure other visual monitoring systems.

These and other aspects, objects, features and advantages of the present invention will be more clearly understood and appreciated from a review of the following detailed description of the preferred embodiments and appended claims, and by reference to the accompanying drawings.

DESCRIPTION OF THE PREFERRED EMBODIMENTS

Figure 1:
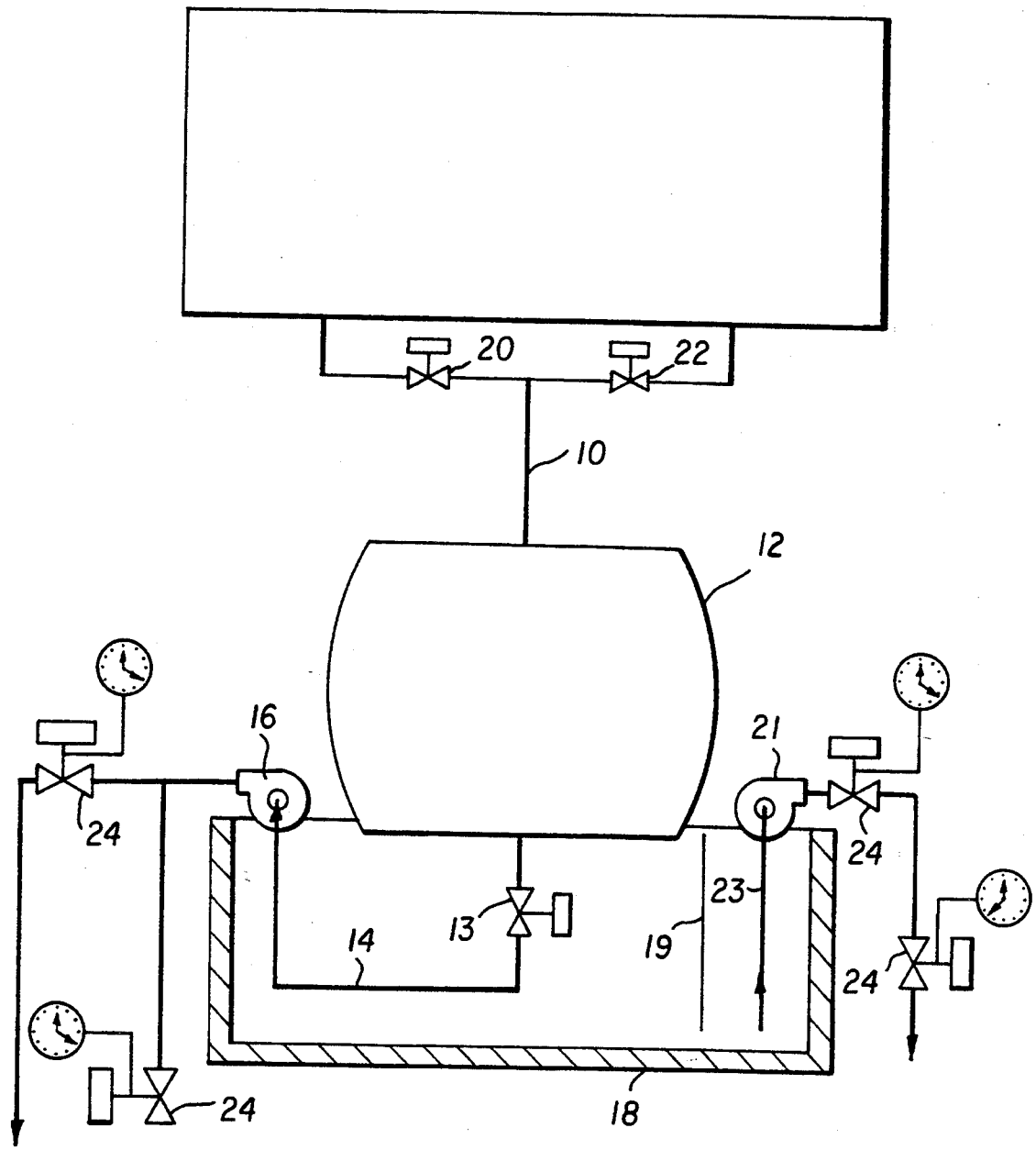
FIG. 1 is a schematic view of a chemical bulk storage system in accordance with the invention illustrating the relative placement of the leak detection apparatus.

FIG. 1 illustrates a chemical bulk storage system in accordance with the invention. A chemical such as a solvent is provided via conduit 10 to storage tank 12. Tank 12 can comprise a permanently installed tank, and it can also be a temporary or portable tank, for example, a railroad tank car, a trailer tank car, or the like. Solvent is removed from tank 12 through valve 13 via conduit 14 by pump 16. As shown, leakage collecting tank 18 is positioned under system components tank 12, valve 13, conduits 10 and 14, and pump 16. Partition 19 defines a sump within tank 18 from which collected liquids are removed by pump 21 via line 23, which are components that are also positioned above tank 18. FIG. 1 further illustrates a second piping loop containing valves 20 and 22 that are also physically situated above tank 18. Tank 18 is means for secondary containment of leaks from tank 12, valve 13, conduits 10 and 14, pump 16, pump 21, line 23, valve 20, and valve 22. Means for secondary containment can also comprise a dike, a vault, or a catch pan, or the like. Valves 13, 20 and 22 can therefore comprise any convenient porting arrangement and design, such as a ball, plug, angle, globe, gate, or butterfly valve having a single stem seal because secondary leakage containment means are provided by tank 18.

Figure 2:
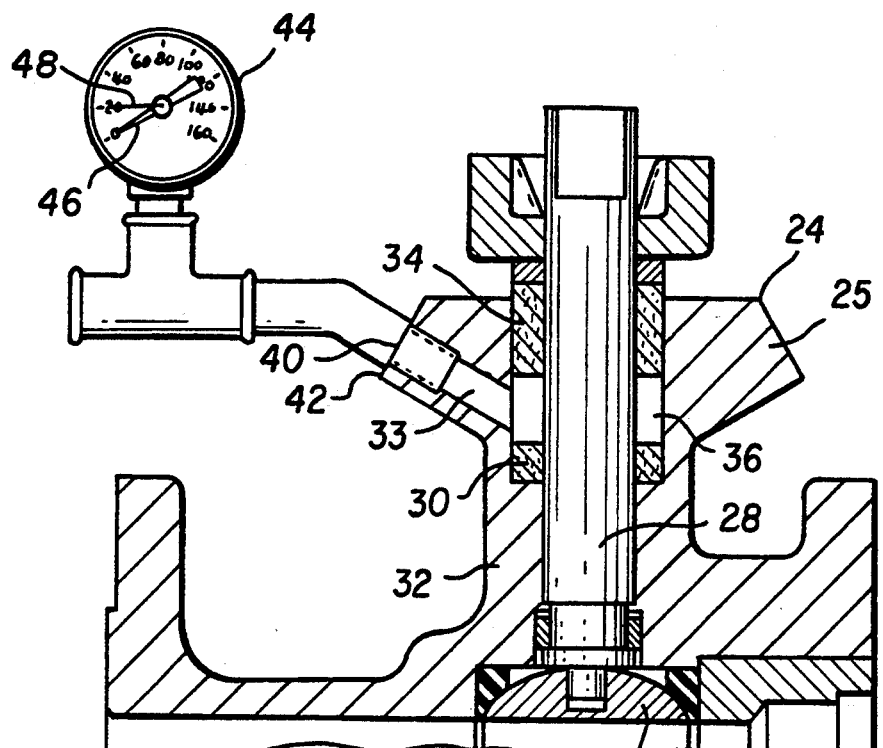
FIG. 2 is a fragmentary, cross-sectional view of the leak detection apparatus in accordance with the invention illustrating a double stem seal valve and a pressure gauge with a first pointer for reading existing pressure and a second pointer for registering and retaining a maximum pressure reading.

Valve 24 is shown in a plurality of locations in FIG. 1 for illustrative purposes, and as shown, valve 24 is not situated above tank 18. Other secondary leakage containment means sufficient to comply with applicable laws and regulations must therefore be provided. Referring now to FIG. 2, valve 24 comprises housing 25, within which is positioned ball valve member 26 positioned on one end of valve stem 28. Valve 24 is a double stem seal valve. Primary stem seal 30 is positioned snuggly between valve housing 32 and stem 28 to prevent leakage of solvent from the system along stem 28. Secondary stem seal 34 is positioned snuggly between housing 32 and stem 28 and is means for containment of solvent leaking past primary stem seal 30. The valve and stem seal design, size, and materials can be readily selected to suit the intended use and environment, the choice of which can be influenced by factors such as system fluid characteristics, e.g. corrosiveness, and system operating conditions, e.g. pressure and temperature. For example, the primary or secondary seal can comprise a filler ring, a lantern ring, and an appropriate filler material therebetween. Housing 25, stem 28, primary stem seal 30, and secondary stem seal 34 altogether define chamber 36 bounded therebetween. Housing 32 has leak detector port 38 extending therethrough from chamber 36 to gauge receptacle 40 in housing surface 42.

The first step of the invention comprises providing pressure gauge 44 for registering and retaining a maximum pressure reading. Gauge 44 is mounted on receptacle 40 and via port 38 is in fluid communication with chamber 36. Gauge 44 has first pointer 46 for registering an existing pressure reading, and second pointer 48, a follower pointer that is alternately referred to in the art as a maximum pressure pointer or lazy hand indicator, for registering and retaining a maximum pressure reading notwithstanding a subsequent decrease in pressure to gauge 44. Gauge 44 can comprise any standard double pointer gauge such as are manufactured by McDaniel Controls, Inc. Alternatively, a pressure gauge having a single pointer for registering and retaining just a maximum pressure reading can be employed.

The next step is positioning gauge 44 in fluid communication with chamber 36. Under non-leakage conditions, chamber 36 typically contains trapped air which will be at the standard pressure for the trapped air temperature and which accordingly should be about one atmosphere (0 psig). Gauge 44 is thus positioned to allow a fluid leak past primary stem seal 30 into chamber 36 sufficient to increase the pressure in chamber 36 to noticeably move first pointer 46 and second pointer 48 from their respective initial positions.

Upon a decrease in pressure in chamber 36, e.g. as when the fluid system is depressurized during shutdown and solvent or air is forced back across primary stem seal 30 into the fluid system side of valve 24, first pointer 46 registers the lower pressure, for example 0 psig, but second pointer 48 continues to register the maximum pressure reading. The next step in the invention is visually monitoring gauge 44 to determine the maximum pressure occurrence in the chamber. An increased reading informs the operator of the existence of a primary stem seal failure and a leak into the chamber notwithstanding a subsequent decrease in chamber pressure.

Figure 3:
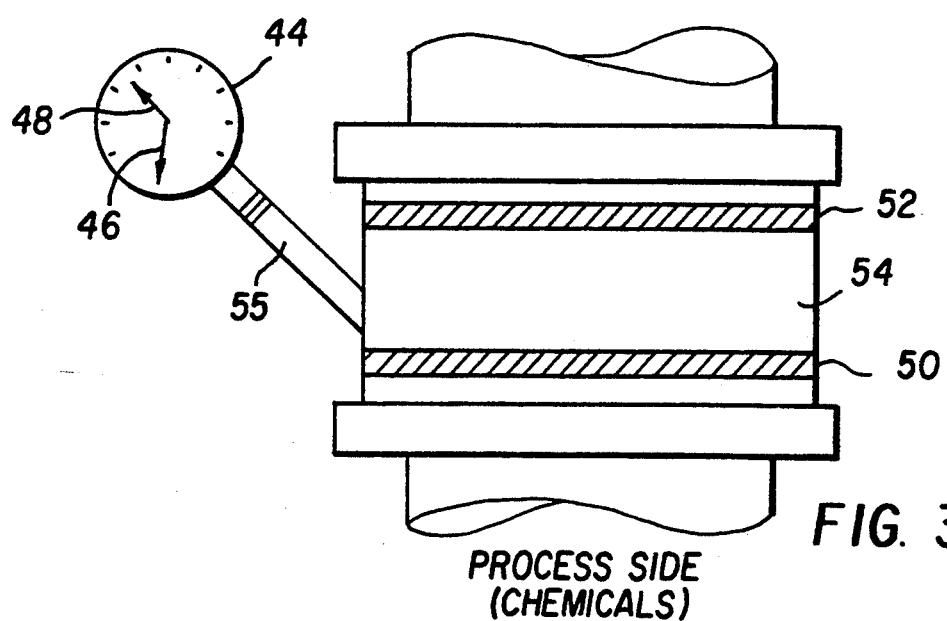
FIG. 3 is a fragmentary, cross-sectional view illustrating the leak detection apparatus in accordance with the invention in a fluid-containing system comprising a primary seal and a secondary seal.

FIG. 3 illustrates another embodiment of the invention in which a fluid-containing system has a primary seal 50 exposed to the fluid providing containment of the fluid, a secondary seal 52 downstream of the primary seal 50, and a chamber 54 between seals 50 and 52. Secondary seal 52 provides backup containment means upon failure of primary seal 50. Pressure gauge 44 is operatively connected to chamber 54 by line 55 for detecting leakage past primary seal 50 in the manner described above.

The invention provides device and method for monitoring for fluid leaks past a primary seal into a chamber between a primary seal and a secondary seal. False pressure gauge readings are minimized, because the chamber has a small volume and contains air that substantially remains at an initial pressure regardless of temperature changes until a fluid leak into the chamber causes the pressure to increase. The maximum pressure pointer records the maximum pressure occurrence despite a subsequent decrease in pressure in the chamber, such as when system pressure and/or temperature decreases. A fluid leak past the primary seal can therefore be detected after its occurrence despite subsequent fluctuations in the system's operating conditions or in ambient temperature. The invention is therefore suitable both for fluid systems run under relatively constant pressure and temperature as well as for fluid systems, e.g. batch operations, subject to fluctuating conditions of pressure, temperature, and the like. A fluid leak undetectable with other detection systems, for example a leak that is not visually observable or that is occluded by environmental conditions such as dirt, ice, ambient temperature variations, or the like, is detectable by the device and method of the invention. The invention does not require electrical connections or involve a complex mechanical design and is therefore relatively inexpensive, especially for multiple installations. The device and method comply with various laws and regulations that mandate leak detection and containment in fluid-containing systems.

The invention has been described in detail with particular reference to a preferred embodiment thereof, but it will be understood that variations and modifications can be effected within the spirit and scope of the invention.

What is claimed is:

1. A fluid-containing system comprising a tank for storing a chemical or hazardous fluid and a valve, the valve comprising a stem, a primary stem seal, a secondary stem seal, and a chamber between the primary and secondary stem seals, wherein a pressure gauge in fluid communications with said chamber comprises a first pointer for registering existing pressure in said chamber, and a second pointer which remains fixed at the maximum pressure registered by said first pointer.

2. The system of claim 1, further comprising conduit means for transporting the fluid to and from the tank and means for secondary containment of fluid leaks from the tank.

3. A method for providing secondary containment for a valve in a fluid-containing system, the fluid-containing system comprising a tank for storing a chemical or hazardous waste, conduit means for transporting the fluid to the tank, conduit means for removing fluid from the tank, means for secondary containment of fluid leaks from the tank, and a valve for controlling flow of the fluid through the conduit means, the valve being positioned at a location in the system remote from the means for secondary containment of fluid leaks from the tank, and the valve comprising a stem, a primary stem seal, a secondary stem seal, and a chamber between the primary and secondary stem seals, comprising the steps of:

providing a pressure gauge having a first pointer for registering existing pressure in said chamber and a second pointer which remains fixed at the maximum pressure registered by said first pointer;

positioning the pressure gauge in fluid communication with the chamber so that a fluid leaks past the primary seal into the chamber sufficient to increase the chamber pressure is registered by the first pointer and retained by said second pointer; and visually monitoring the pressure gauge to determine the maximum pressure occurrence in the chamber.

* * * * *